United States Patent [19]

Grimaud et al.

[11] Patent Number: 5,546,530
[45] Date of Patent: Aug. 13, 1996

[54] METHOD AND APPARATUS FOR RENDERING GRAPHICAL IMAGES USING PARALLEL PROCESSING

[75] Inventors: Jean-Jacques G. Grimaud, Portola Valley; Jaron Z. Lanier, Palo Alto; Arthur Abraham, Oakland; Young Harvill, San Mateo, all of Calif.

[73] Assignee: VPL Research, Inc., Redwood City, Calif.

[21] Appl. No.: 328,505

[22] Filed: Oct. 25, 1994

Related U.S. Application Data

[63] Continuation of Ser. No. 170,566, Oct. 6, 1993, abandoned, and a continuation of Ser. No. 621,450, Nov. 30, 1990, abandoned.

[51] Int. Cl.$^6$ ............................................. G06F 15/16
[52] U.S. Cl. ..................... 395/163; 395/122; 395/164; 395/160
[58] Field of Search ........................... 395/160–164, 395/122, 135; 345/98, 185, 189

[56] References Cited

U.S. PATENT DOCUMENTS

4,737,921  4/1988  Goldwasser et al. ............... 395/163
4,928,247  5/1990  Doyle et al. ........................ 395/164
4,961,153  10/1990  Fredrickson et al. ............... 395/122

*Primary Examiner*—Kee Mei Tung
*Attorney, Agent, or Firm*—Oblon, Spivak, McClelland, Maier & Neustadt, P.C.

[57] ABSTRACT

A distributed animation comprising a plurality of processors wherein each processor is responsible for rendering only a portion of the entire image. After the plurality of processors compute their respective images, the image data is communicated to a buffer. The buffer also receives image data from other sources. The buffer combines the image data from all sources into a single image frame which is then stored in a frame buffer. The buffer comprises a plurality of buffer elements, each buffer element being associated with a single graphics element (processor or video source). Each buffer element includes an input terminal for receiving pixel data from its corresponding graphics element, an output terminal for outputting pixel data, and a second input terminal for receiving pixel data from the output terminal of a previous buffer element. The pixel data typically includes a Z value which provides the depth location in the image of the object represented by that pixel. The Z value of the pixel received on the first input terminal is compared to the Z value of the pixel received on the second input terminal, and the multiplexer outputs the pixel value that is "closer" in the image.

10 Claims, 7 Drawing Sheets

METHOD AND APPARATUS FOR RENDERING GRAPHICAL IMAGES USING PARALLEL PROCESSING

This is a continuation of application Ser. No. 08/170,566 filed on Oct. 6, 1993, now abandoned, which was a continuation of application Ser. No. 07/621,450, filed on Nov. 30, 1990, now abandoned.

BACKGROUND OF THE INVENTION

The present invention relates to computer animation, and, more particularly, to a method and apparatus for rending graphical images using distributed processing.

Computer animation often is used to simulate real-world environments and to allow interaction between users of the computer System and the animated worlds illustrated. For example, U.S. patent application Ser. No. 08/133,802 filed Oct. 8, 1992, which is a continuation of Ser. No. 07/535,253, filed on Jun. 7, 1990, entitled Virtual Reality Network discloses a virtual reality network wherein users perceive and interact with a virtual environment. In one application, two apprentice automobile mechanics may use the virtual reality network to work on an animated automobile engine.

Figures 1, 7:
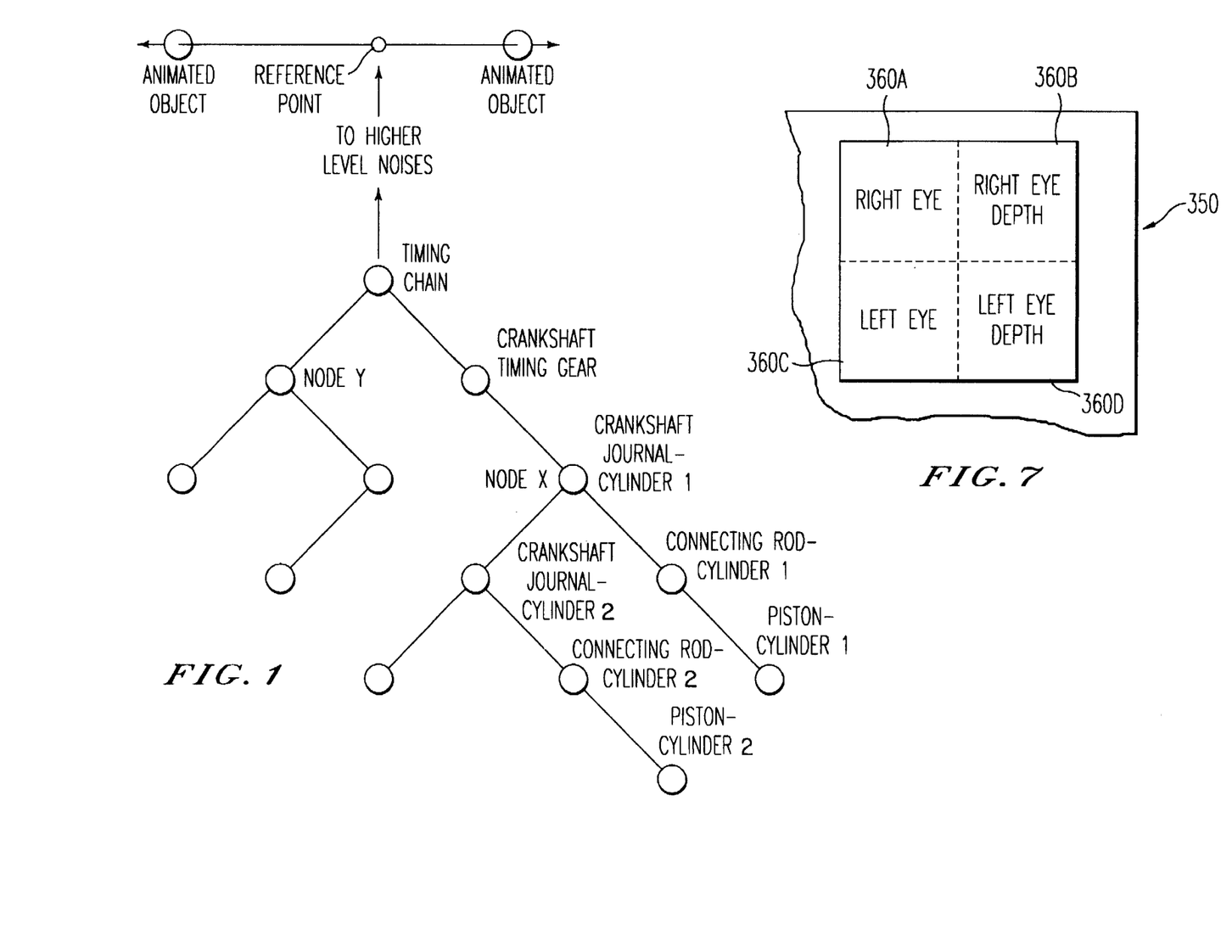
FIG. 1 is a diagram of a particular embodiment of a hierarchical tree structure for a virtual environment according to the present invention.
FIG. 7 is a diagram showing a particular embodiment of a workstation monitor which may be used with the distributed animation system according to the present invention.

In order to adequately simulate a real-world environment, a great deal of information must be associated with each animated object so that the objects have the proper real-world appearance and interactions. Using the automobile engine example noted above, it is necessary to define a large number of parts, some which move and others which are stationary. At the minimum, the animator must define each part and its constraints of motion. Of course, a part's motion may be dependent upon some other part. Thus, cataloging and expressing this information adequately and correctly can be quite complex. One method which the animator may use is to define a hierarchical tree structure, a portion of which is shown in FIG. 1. This is the method used in the above-referenced patent application, and it is accomplished by the swivel-3D program referred to therein. The hierarchical tree comprises a plurality of linked nodes, each node being associated with a part and/or motion type. Each node may define the proper position of a part, relative to some other node, and its range of motion. Of course, each object still has attributes associated with it separate and apart from the tree description, such as texture and color. Because each node is linked to at least one other node, the action of each node is dependent upon the constraints defined for the nodes located higher up the tree. Ultimately, each node traces a connection to a fixed reference point. The tree thus defines relationships of motion between all elements of the animated scene.

Once the animated world has been defined, real-world data must be coupled to it. For example, the movements of the real-world mechanics noted above must produce corresponding movements by the mechanics in the animated world. One way to do this is to have a computer receive various inputs describing forces which are to act upon the various elements of the graphical scene and to couple the input data to the various nodes. The "body electric" program accomplishes this task in the above-identified patent application. The graphics computer then renders an initial image and uses the tree structure and input data to render successive images at a rate of about 60 images per second. To allow the images to be rendered as quickly as possible, it is preferable to update each current image with new input data rather than render the entire image from the beginning.

Figure 2:
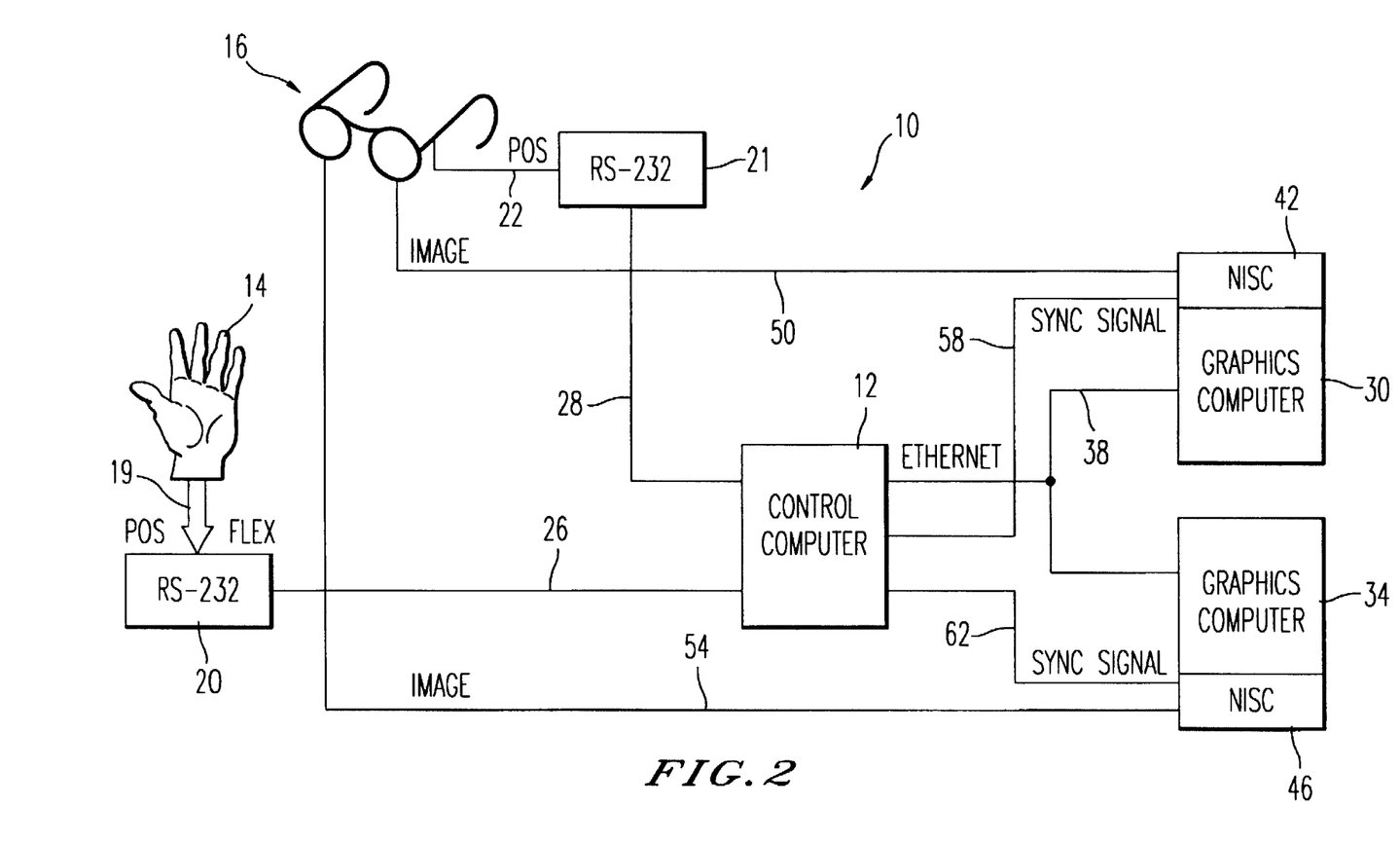
FIG. 2 is a block diagram showing a particular embodiment of a virtual reality system according to the present invention.

FIG. 2 is a block diagram of an animation system 10 such as that shown in the above-identified patent application. In this system, the control computer 12 has a copy of the hierarchy tree and generates a list of nodes whose values have changed since the last image was rendered. In this embodiment, a special interactive glove 14 and a head-mounted display 16 provides real-world inputs to control computer 12. Of course, other input devices may be used as well. The glove 14 includes sensors (not shown) which provide position and flex information to an RS232 interface 20 over a bus 19. The head-mounted display also includes sensors to provide position data to an RS232 interface 21 over a bus 22. The input data from glove 14 and head-mounted display 16 are communicated to control computer 12 over buses 26 and 28. Control computer 12 then generates a list of nodes whose values have changed since the last image was rendered and provides this list to two separate graphics computers 30 and 34 over an ethernet coupling 38. The graphics computers 30 and 34 render the updated image in response to the list of changed nodes. Each graphics computer provides the images for one eye in standard NTSC format. The images are then communicated to head-mounted display 16 over buses 50 and 54, respectively. Synchronizing circuits 42 and 46 provide synchronizing signals over buses 58, 62, respectively, to indicate that its associated graphics computer 30, 34 has completed rendering its image and that another changed node list can be processed.

As the complexity of the graphical scene increases, rendering images within acceptable animation limits becomes more difficult both in terms of the number of objects to be displayed and the time it takes for the graphics computers to render the image. Thus, a user With a limited graphics library or processing capability will be unable to create more intricate animated environments.

SUMMARY OF THE INVENTION

The present invention is a method and apparatus which allows animation information and processor power from a plurality of different sources to be combined for rendering complex graphical scenes which one machine would be incapable of doing alone. A device built according to the present invention may comprise a monolithic board with the processors already in place or, alternatively, a bus with card slots so that users may add processors as desired. Advantages of the present invention include fixed bandwidth processing which produces a linear cost/performance curve rather than the conventional exponential cost/performance behavior. The linear cost/performance curve is maintained even for a very large number of processors. The present invention allows the user to combine conventional graphics chips from different manufacturers even if the chips were not intended to work with each other.

In one embodiment of the present invention, each processor in the network is provided with a copy of the hierarchical tree which enables it to render a complete image. However, each processor is responsible only for a portion of the entire image represented by a subtree below a selected node. Thus, when the control computer provides the list of changed nodes, each processor need render only the portion of the image which contains the selected subtree. After the plurality of processors compute their respective images, the image data is communicated to a buffer. The buffer also receives image data from other sources. The buffer combines the image data from all sources into a single image frame which is then stored in a frame buffer.

The buffer comprises a plurality of buffer elements, each buffer element being associated with a single graphics element (processor or video source). Each buffer element includes an input terminal for receiving pixel data from its corresponding graphics element, an output terminal for outputting pixel data, and a second input terminal for receiving pixel data from the output terminal of a previous buffer element. The pixel data typically includes a Z value which provides the depth location in the image of the object represented by that pixel. The Z value of the pixel received on the first input terminal is compared to the Z value of the pixel received on the second input terminal, and the multiplexer outputs the pixel value that is "closer" in the image.

DESCRIPTION OF SPECIFIC EMBODIMENTS

The present invention may be incorporated into, e.g., a virtual reality network such as the one disclosed in U.S. patent application Ser. No. 07/535,253, filed Jun. 7, 1990, entitled Virtual Reality Network and incorporated herein by reference. That system is also broadly illustrated in FIG. 2.

Figure 3:
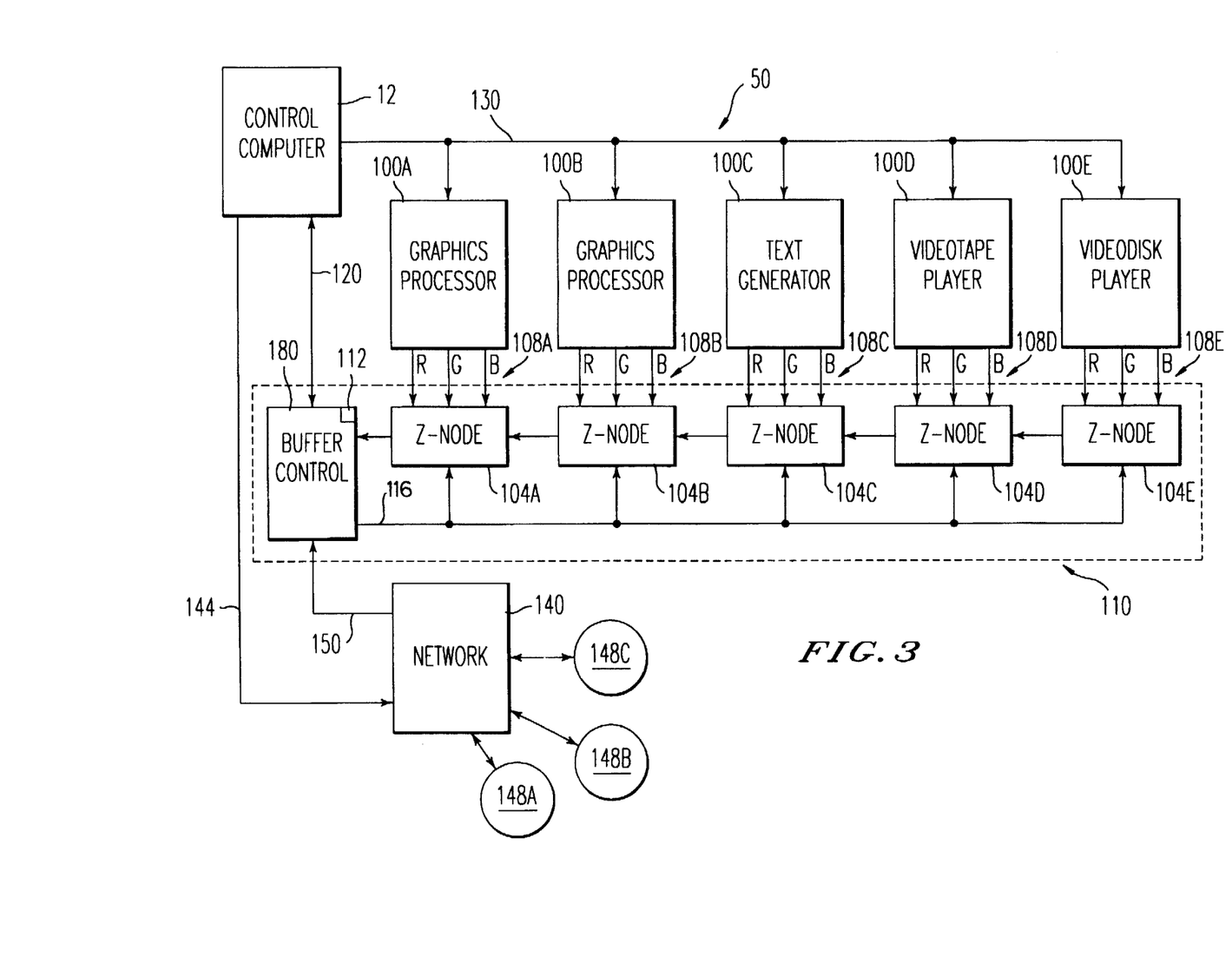
FIG. 3 is block diagram of a particular embodiment of a distributed animation system according to the present invention.

FIG. 3 is a block diagram of a particular embodiment of a distributed animation system 50 according to the present invention. In this embodiment, the system shown is capable of rendering images for one eye. Animation system 50 comprises control computer 12 which functions in the same manner as the control computer shown in FIG. 2. Control computer 12 communicates through a bus 130 with a plurality of graphics elements 100A–100E. Graphics elements 100A–100E may be graphics processors such as elements 100A and 100B, a text generator such as element 100C, a video tape player such as element 100D, a video disk player such as element 100E, or some other graphics element. Each graphics element 100A–100E communicates red-green-blue (RGB) information to a corresponding buffer element 104A–104E in a buffer 110 over RGB buses 108A–108E. Each Z node provides synchronizing information to its associated processor. Buffer 110 also includes a buffer control unit 112 which communicates with and controls the operation of buffer elements 104A–104E through a buffer element control bus 116. Buffer control unit 112 communicates with control computer 12 through a control bus 120. It should be noted that graphic elements 100A–100E and buffer 110 are not limited to physically adjacent elements. Control computer 12 may communicate with a network interface 140 over a network interface input bus 144 for communicating with graphics elements such as elements 148A–148C. The network includes buffer elements similar to buffer elements 104A–104E which, in turn, communicate information to buffer control unit 112 through a network buffer interface bus 150.

Figure 4:
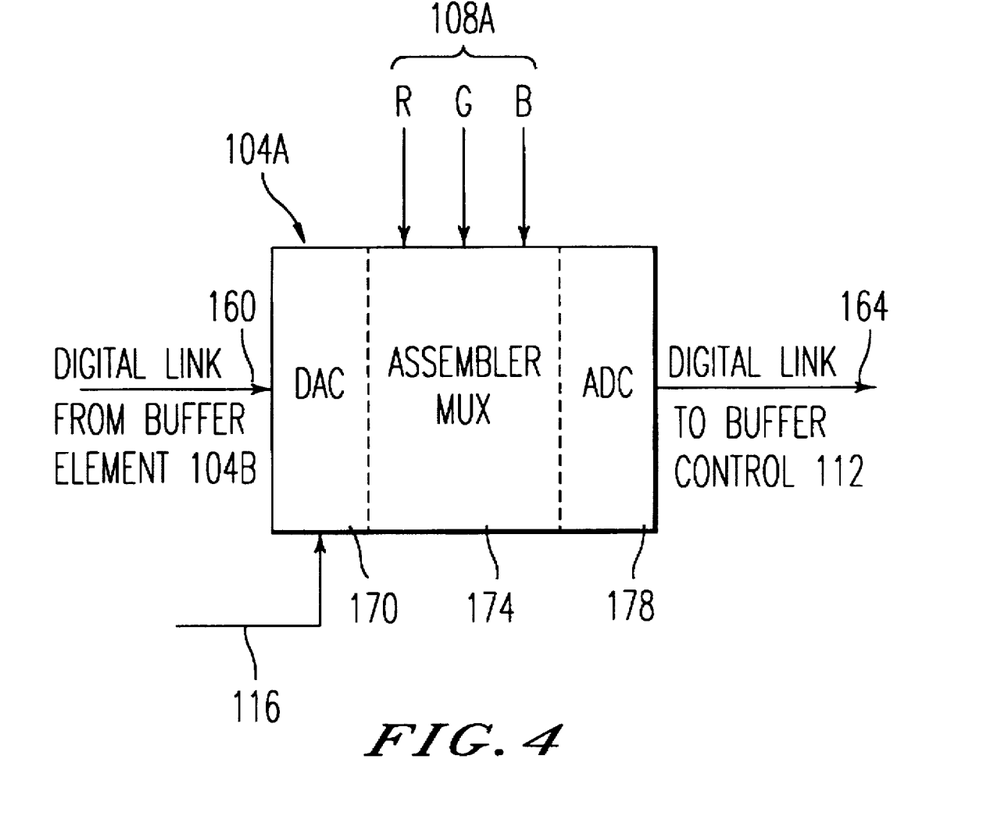
FIG. 4 is a block diagram of a particular embodiment of a buffer element according to the present invention.

FIG. 4 is a block diagram of a particular embodiment of a buffer element according to the present invention such as buffer element 104A. The other buffer elements are constructed in the same way. As noted previously, buffer element 104A receives RGB inputs over RGB bus 108A. Buffer element 104A also includes an input terminal 160 for receiving digital pixel data from a previous buffer element, and an output terminal 164 for communicating digital pixel data to the next buffer element which, for this buffer element, is buffer control 112. In one embodiment, the digital pixel data appearing on input terminal 160 is converted into analog form by a digital-to-analog converter 170. The analog input signal is then communicated to an assembler/multiplexer 174. Assembler/multiplexer 174 selects one of the signals from input terminal 160 or RGB bus 108A and communicates the selected signal to an analog-to-digital converter 178. Analog-to-digital converter 178 converts the selected signal to digital form and communicates the digitized signal to output terminal 164. Selected pixels may be stored in an intermediate buffer prior to being communicated to output terminal 164 if necessary for synchronization. In another embodiment, comparison is done in the digital domain. In that case, the RGB information is converted to digital form and compared with the data on input terminal 160. The selected pixel then may be stored in a buffer and communicated to output terminal 164.

Figure 5:
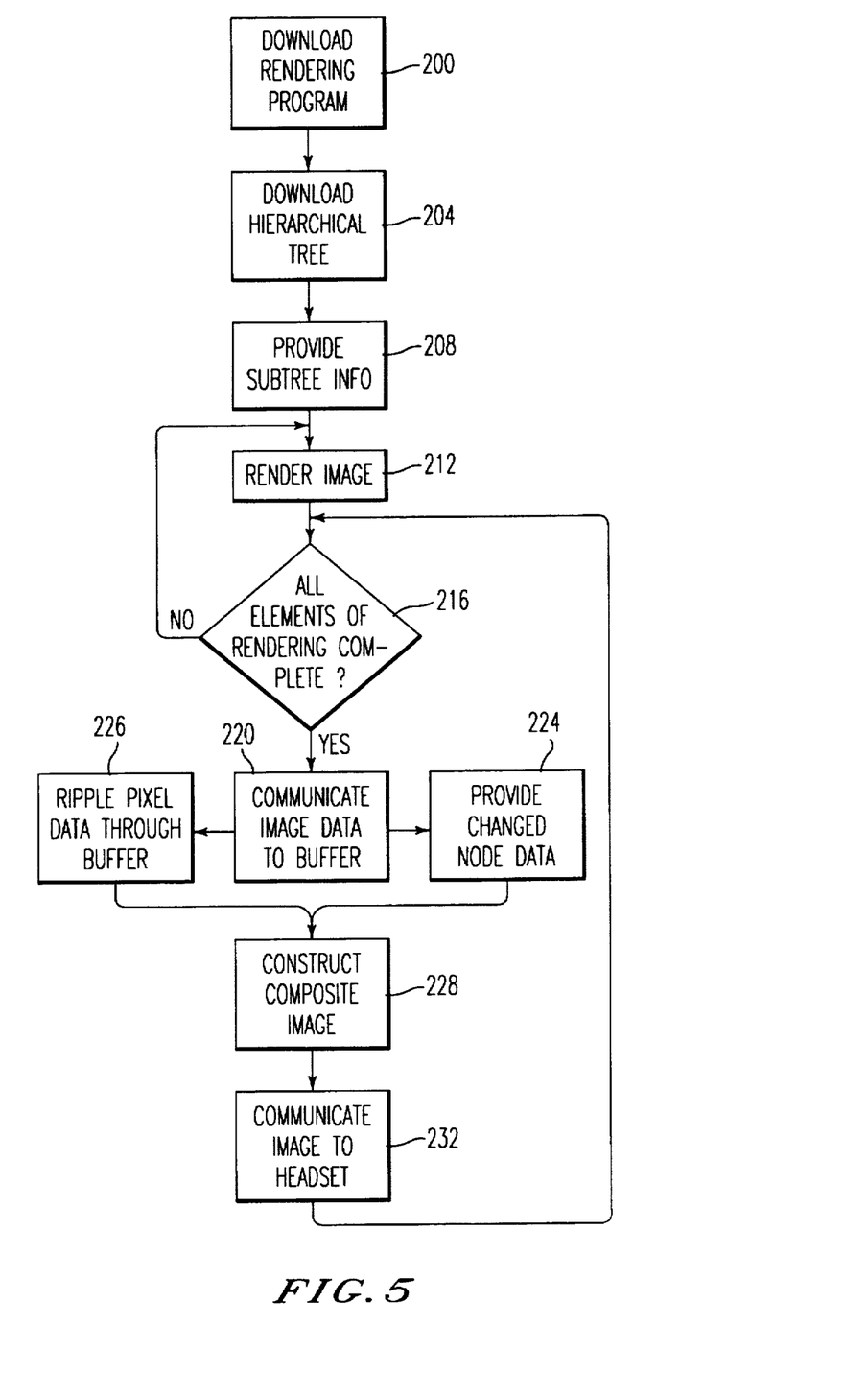
FIG. 5 is a flow chart showing the general operation of a particular embodiment of a distributed animation system according to the present invention.

General operation of the system may be understood by referring to FIG. 5. Initially, control computer 12 downloads the rendering program to the graphics elements in a step 200. The hierarchical tree data is then downloaded to the graphics elements in a step 204, and the subtree information is provided in a step 208. In this embodiment, each graphics element renders only the image corresponding to its own subtree. For example, in the embodiment discussed with respect to FIG. 1, one graphic element will render the image from node X downward, and another graphic element will render the element from node Y downward. It is also possible for a machine to render the image corresponding to nodes between node X and node Y. The images are rendered in a step 212. Depending on the speed of which each frame is generated by each graphics element, the graphics element may either store it in a frame buffer or process it on the scan line interval or process it at a pixel interval.

It is then ascertained in a step 216 whether all graphics elements have completed rendering their respective images. If not, then the rendering continues in step 212.

Different schemes may be used to synchronize the system. For example, the buffer control 112 may send a signal through the buffer and ask for a reply from each buffer element. Alternatively, a "dirty pixel" area may be used to designate the status of each buffer element. The pixel area contains one pixel for each buffer element in the system. Thus, in dual buffer systems, the color of the pixel represents which of the two buffers is currently being displayed. Black could indicate the first buffer while white would indicate the second buffer. The dirty pixel values are communicated through the plurality of buffer elements as each graphic element completes its rendering task. Processing is suspended until all the pixels in the dirty pixel area are the same color, and then the video data is released to the buffer.

If all graphics elements have completed rendering their respective images, then the image data is communicated to buffer 110 in a step 220. When different screen formats are handled, a comparator for the number of pixels allowed may be used to cut the end of the line and another one to cut the number of lines to the proper format. For machines having small screens, resolution may be doubled or memory accessed directly without having to go through the video. The changed node data for the next image frame may be communicated to the graphics elements by control computer 12 in a step 224 while the pixel data is rippling through buffer 110 in a step 226. The composite image may be constructed by storing the emerging pixel data in a frame buffer 180 resident within buffer control unit 112 in a step 228. The composite image is then communicated to headset 16 in a step 232, and processing continues in step 216. Alternatively, the emerging pixel data is converted to NTSC format and communicated directly to headset 16.

Figure 6:
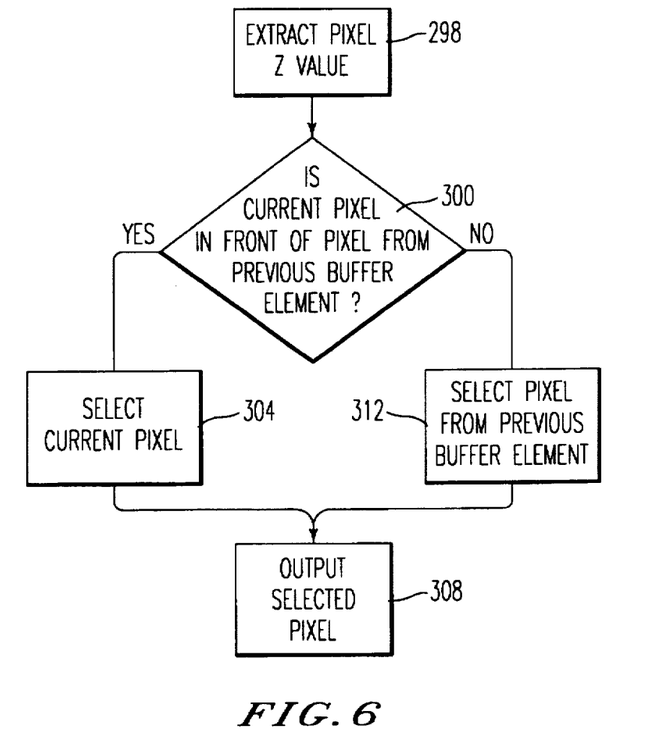
FIG. 6 is a flow chart showing the general operation of a particular embodiment of a buffer element according to the present invention.

FIG. 6 shows the processing which occurs in each buffer element. In this embodiment, each pixel has a Z value associated with it which represents the depth location within the image. The Z value typically is provided in a separate buffer in most graphics computers. For display list systems, the depth information may be found in the computational model, or it may be provided by the user. In this embodiment, the Z value is encoded within the RGB information, and it is extracted by assembler and multiplexer 174 in each buffer element in a step 298. The buffer element then ascertains in a step 300 whether the current pixel represents an object that is in front of the object represented by the pixel received from a previous buffer element. If so, then the current pixel is selected in a step 304, and the selected pixel is output to the next buffer element (or to buffer control 112 in the case of buffer element 104A) in a step 308. If the current pixel does not represent an object that is in front of the object represented by the pixel from the previous buffer element, then the pixel value from the previous buffer element is selected in a step 312, and that pixel value is output in step 308.

FIG. 7 illustrates a portion of a screen display 350 which may be used to show how the depth information is encoded in the image data. Four quadrants, labeled 360A-360D are illustrated. Quadrant 360A displays the actual frame that is to be communicated to the right eye, whereas quadrant 360B shows the same frame but with color mapping of the depth information. Thus, an object that appears blue in quadrant 360A may be shown as pink in quadrant 360B to convey the fact that the object is located five feet in the image. Similarly, the actual image communicated to the left eye is illustrated in quadrant 360C, and the color-mapped image is shown in quadrant 360D.

Figure 8:
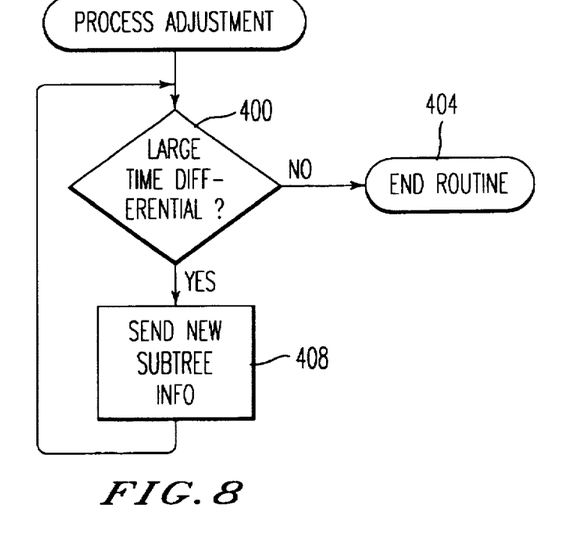
FIG. 8 is a flow chart showing the general operation of a particular embodiment of a distributed animation system according to the present invention.

To ensure that a single graphics element is not overburdened with its rendering task, the present invention allows dynamic adjustment of each graphics element 100A-100E. The adjustment routine is shown in FIG. 8. It is ascertained in a step 400 whether a particular graphics element takes substantially longer than the others to render its associated image. If no large time differential exists, then the routine ends in a step 404. However, if a large time differential does exist, then new subtree information is communicated by control computer 12 to the affected graphics element in a step 408. Typically this involves "cutting" the tree so that the slower graphics element renders a smaller subtree. The cut portion may be rendered by one of the other graphics elements. The routine continues until the graphics elements take approximately the same time to render their respective images.

It should be apparent that the present invention provides a system which allows different graphics machines from various computer manufacturers to be connected together to render complex images faster than any one of them taken separately would be able to render. Thus, the existing graphics computing investment of the user may be leveraged so that he or she does not necessarily need to buy expensive graphics systems to generate complex images at high frame rates. The user may gradually increment his or her graphics computing power by adding machines to the system as he or she sees fit.

Figure 9:
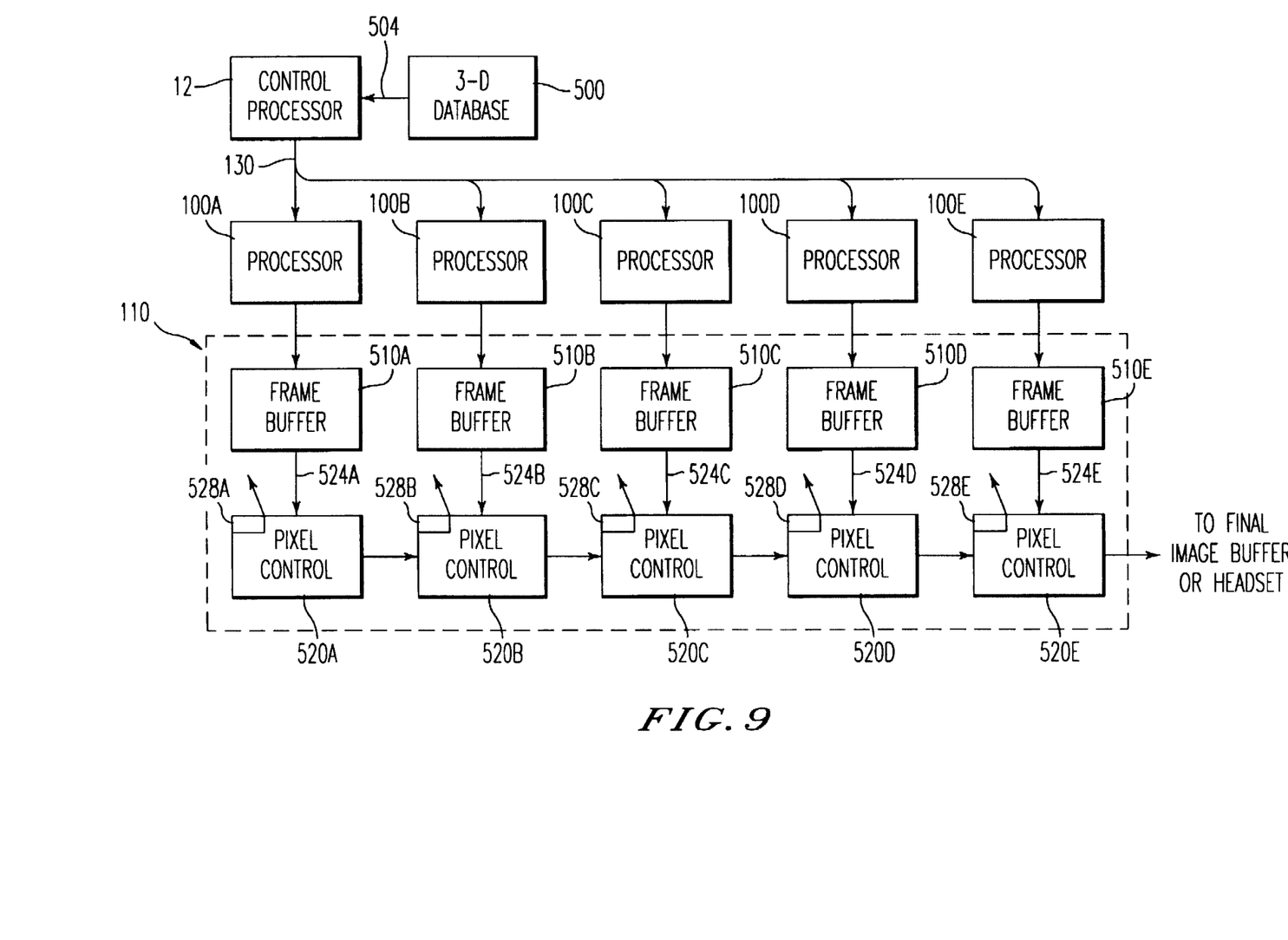
FIG. 9 is a block diagram of an alternative embodiment of a distributed animation system according to the present invention.

While the above is a complete description of a preferred embodiment of the present invention, various modifications may be employed. For example, FIG. 9 is a block diagram of an alternative embodiment of a distributed animation system of according to the present invention. In this embodiment, control processor 12 receives three-dimensional animation information from a 3D database 500 over a database bus 504. The information in 3D database 500 may comprise three-dimensional points that create polymeshes that are subsequently rendered by processors 100A-100E. Control processor 12 communicates selected data from 3D database 500 to processors 100A-100E which then render the portion of the image represented by the data. For example, if the animation system is to create a frame showing an animated hand, processor 100A could be supplied with the data for rendering the thumb, processor 100B could be provided with the data for rending one or more fingers, processor 100C could be provided With the data for rendering the palm, processor 100D could be provided with the data for rendering the wrist, and processor 100E could be provided with the data for rendering a bracelet that is worn around the wrist. Alternatively, each processor could have access to the entire database but be instructed to render only the body part of interest. Each processor renders its corresponding body parts and stores a full frame with the rendered part in the correct place to corresponding frame buffers 510A-150E. Depth information is also provided to the frame buffers. In another embodiment, only a portion of the frame need be stored in a frame buffer. When a given processor completes its rendering tasks, then the control processor may also assign that processor more rendering tasks to ease the burden on the other processors. Frame buffers 510A-510E communicate the pixel data to pixel control circuits 520A-520E over buses 524A-524E, respectively. Each pixel control circuit 520A-520E includes a pointer register 528A-528E which points towards individual pixel locations within the corresponding frame buffers 510A-510E. In operation, pixel control circuit 520B reads the color and depth information from the address indicated by pointed register 528B, compares the depth value of the currently read pixel with the pixel received from pixel control circuit 520A, and sends the "closer" pixel to pixel control circuit 520C. Pixel control circuit 520B then erases the addressed pixel within frame buffer 510B and increments pointer register 528B. Pixels could be erased on a line or frame basis. Pixel control circuit 520C performs the same operation when it receives the selected pixel from pixel control circuit 520B and so on down the line. The pixel data selected by pixel control circuit 520E then is communicated to a final image buffer or to the headset or other display (as a real time video controller). This embodiment is particularly useful when special purpose machines are used for one or more of processors 100A-100E. For example, "bit blitting" machines may be used to transfer rectangles from one portion of memory to another (or within the image). Spherical objects may be rendered by a processor which stores a plurality of circular images of different sizes together with depth information for each circle (stored separately). The rendering machine first transfers one of the circular images to the frame buffer and then transfers the appropriate depth information to the frame buffer (with or without offset). Lines in three dimensions may be drawn by a machine which accepts endpoints and renders the line by successive division by two of each of the three coordinates.

Consequently, the scope of the invention should not be limited except as described in the claims.

What is claimed is:

1. An apparatus for rendering graphical images by parallel processing, comprising:
   a plurality of processors, each processor comprising:
      model receiving means for receiving a model of an image, the model comprising a plurality of linked nodes, each node having associated therewith data representing an attribute of the image;
      node data receiving means for receiving node data corresponding to a change in the image;
      rendering means, coupled to the model receiving means, for rendering only a portion of the image corresponding to a subset of the plurality of linked nodes, the portion of the image comprising a plurality of pixels;
   a buffer comprising a plurality of buffer elements, each buffer element comprising:
      a first input terminal for receiving pixel data from a corresponding processor;
      an output terminal for outputting pixel data;
      a second input terminal for receiving pixel data from the output terminal of another buffer element; and
      multiplexing means, coupled to the first and second input terminals and to the output terminal, for selecting the pixel data from one of the first or second input terminals and for communicating the selected pixel data to the output terminal;
   wherein each of said processors renders only a portion of said image corresponding to the subset of the plurality of linked nodes thereof, and said processors operate simultaneously on different portions of the image.

2. The apparatus according to claim 1 further comprising depth value assigning means, coupled to one of the plurality of buffer elements, for assigning a depth location value to pixel data which lacks preexisting depth location data.

3. The apparatus according to claim 1 wherein the pixel data includes depth location data, and wherein the multiplexing means in a buffer element selects the pixel data to be communicated to the output terminal of the buffer element in response to the depth location data.

4. The apparatus according to claim 3 wherein the depth location data is color mapped in the pixel data.

5. The apparatus according to claim 1 wherein the plurality of buffer elements form a chain having first and last buffer elements, and further comprising:
   a frame buffer, coupled to the last buffer element, for receiving pixel data therefrom and for constructing and storing an image frame from the pixel data.

6. The apparatus according to claim 5 further comprising synchronizing means, coupled to the buffer, for synchronizing a flow of pixel data through the buffer elements.

7. The apparatus according to claim 6 wherein the synchronizing means further comprises:
   a dirty pixel buffer for storing a plurality of pixel values, each pixel value corresponding to a processor;
   wherein the value of each pixel indicates whether the processor associated with that pixel has completed rendering its associated image;
   completion means, associated with each processor, for detecting when a processor has completed rendering its associated image and for generating an image complete signal;
   pixel communicating means, associated with each processor and responsive to the image complete signal, for communicating a pixel value indicating that the associated processor has completed rendering its associated image to the dirty pixel buffer in response to the image complete signal.

8. The apparatus according to claim 7 wherein the synchronizing means further comprises buffer advance means for instructing each processor to communicate its associated image data to its associated buffer element when the values stored in the dirty pixel buffer indicate that all processors have completed rendering their associated images.

9. A distributed computation system for rendering graphical images, comprising:
   a memory for storing a model of an image, the model comprising a plurality of linked nodes, each node representing an attribute of the image;
   a plurality of processors, each processor for calculating only a portion of said image using those of said nodes which corresponds thereto; and
   a combination means for combining said portions calculated by said plurality of processors to form said image, said combination means including a plurality of buffers, wherein each of the buffers includes:
      a first input terminal for receiving pixel data from a corresponding processor;
      an output terminal for outputting pixel data;
      a second input terminal for receiving pixel data from the output terminal of another of the buffers; and
      multiplexing means, coupled to the first and second input terminals and to the output terminal, for selecting the pixel data from one of the first and second input terminals and for communicating the selected pixel data to the output terminal.

10. A distributed computation method for rendering graphical images, comprising the steps of:
    storing a model of an image in a memory, the model including a plurality of linked nodes, each node representing an attribute of the image;
    assigning at least one node to each of a plurality of processors;
    simultaneously calculating, using the plurality of processors, portions of said image using said at least one node assigned to each of said plurality of processors; and
    combining said image portions calculated by said plurality of processors to form said image, said combining step using a plurality of buffer elements and including the steps of:
       receiving pixel data from a corresponding processor through a first input;
       receiving input data from an output of a preceding buffer element through a second input; and
       selecting pixel data from one of the first and second inputs and outputting the selected pixel data.

* * * * *